United States Patent
Hayashi et al.

(10) Patent No.: US 7,101,411 B2
(45) Date of Patent: Sep. 5, 2006

(54) APPARATUS FOR GENERATING HYDROGEN GAS

(75) Inventors: Takahiro Hayashi, Sunoso (JP); Mamoru Ishikiriyama, Mishimashi (JP); Masahiko Sugiyama, Mishima (JP); Yasukazu Saito, Suginami-ku (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 695 days.

(21) Appl. No.: 10/082,250

(22) Filed: Feb. 26, 2002

(65) Prior Publication Data

US 2002/0122759 A1    Sep. 5, 2002

(30) Foreign Application Priority Data

Mar. 1, 2001    (JP) .............................. 2001-056683

(51) Int. Cl.
*B01J 7/00* (2006.01)
(52) U.S. Cl. ...................... 48/61; 48/85; 48/86; 48/87; 48/88; 48/89; 48/197 R; 48/204; 422/198; 422/211; 422/212
(58) Field of Classification Search ............... 422/198, 422/211, 212; 48/61, 85–89, 197 R–204
See application file for complete search history.

(56) References Cited

U.S. PATENT DOCUMENTS

| 3,306,706 A | 2/1967 | Schuman | 23/212 |
| 3,505,116 A | 4/1970 | Weisz | 136/86 |
| 6,074,447 A | 6/2000 | Jensen | 48/61 |
| 6,802,875 B1 * | 10/2004 | Kimbara et al. | 48/61 |

FOREIGN PATENT DOCUMENTS

| CA | 1 146 725 | 5/1983 |
| DE | 2 160 811 | 6/1973 |
| EP | 1 081780 A2 | 3/2001 |
| JP | B2 3-9091 | 2/1991 |
| JP | B2 5-18761 | 3/1993 |
| JP | 2001-110437 | 4/2001 |

* cited by examiner

*Primary Examiner*—Glenn Caldarola
*Assistant Examiner*—Vinit H. Patel
(74) *Attorney, Agent, or Firm*—Oliff & Berridge, PLC

(57) ABSTRACT

An apparatus for generating hydrogen gas in which hydrogen gas of a high purity is supplied to a hydrogen-utilizing device by using a decahydronaphthalene/naphthalene reaction. The apparatus includes a storage tank in which decahydronaphthalene is stored as a crude fuel, a reaction tank which has a catalyst and a heater for heating the catalyst and which causes dehydrogenation of decahydronaphthalene supplied from the storage tank to the heated catalyst, and a separation tank in which hydrogen-rich gas is separated out from naphthalene and hydrogen gas supplied from the reaction tank by using a hydrogen separation film and from which the separated hydrogen gas is discharged.

27 Claims, 12 Drawing Sheets

FIG.11
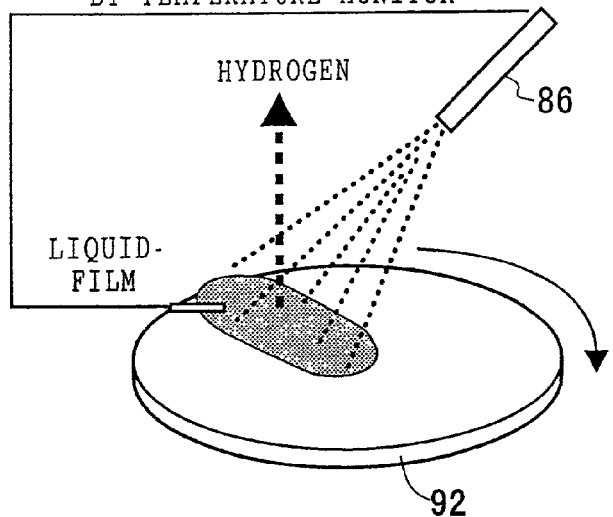
FIG.12A
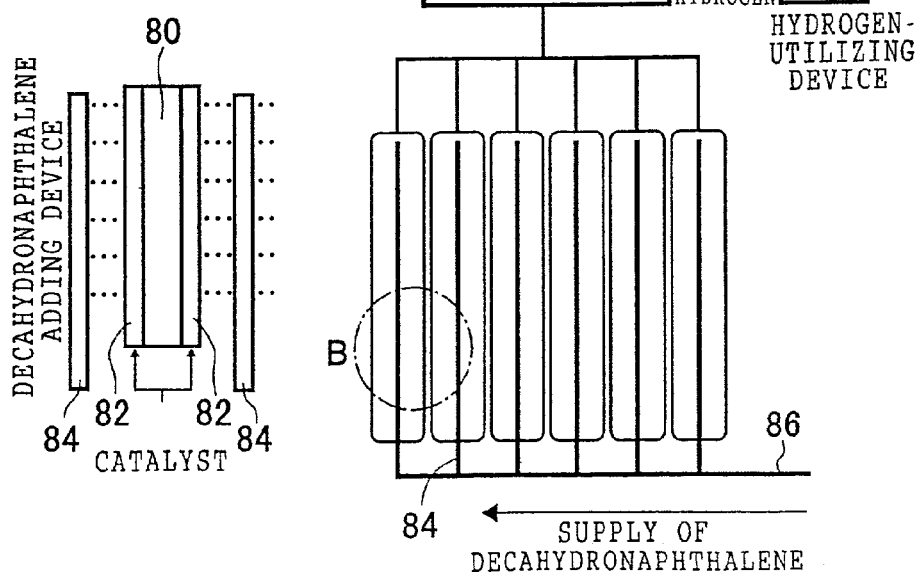
FIG.12B

APPARATUS FOR GENERATING HYDROGEN GAS

BACKGROUND OF THE INVENTION

1. Field of the Invention

The present invention relates to an apparatus for generating hydrogen gas (gaseous hydrogen), and particularly to an apparatus for generating hydrogen gas which can be mounted in a vehicle such as an electric vehicle and can supply hydrogen gas to fuel cells mounted in the vehicle.

2. Description of the Related Art

Conventionally, an electric vehicle carries fuel cells as a power source for obtaining driving force of the vehicle and is loaded with hydrogen, as a fuel which is used to carry out power generation in the fuel cells, or with a crude fuel which is used to produce hydrogen. Hydrogen is loaded on the electric vehicle in the form of a cylinder (tank) filled with compressed hydrogen gas or in the form of a hydrogen-absorbing alloy or hydrogen-absorbing material into which hydrogen is absorbed. Further, an electric vehicle loaded with a crude fuel is loaded with a hydrocarbon crude fuel, such as methanol or gasoline, and includes a hydrogen generator for generating hydrogen-rich gas by steam reforming the crude fuel.

However, hydrogen storage density of the hydrogen-absorbing alloy or hydrogen-absorbing material is not sufficient for use in fuel cells of an electric vehicle, and it is very difficult to control storage and absorption of hydrogen. Compared with an electric vehicle loaded with hydrogen, an electric vehicle loaded with a crude fuel has the advantage of a longer travelling distance on one supply of fuel, and also has the advantage that the crude fuels such as hydrocarbons are easier to handle and is safer to transport than hydrogen gas.

Decahydronaphthalene (Decalin), which is a hydrocarbon, has a vapor pressure of approximately zero at ordinary temperatures (the boiling point is close to 200° C.) and is easy to handle. Accordingly, the possibility that decahydronaphthalene can be used as the above-described crude fuel has been foreseen.

As a dehydrogenation method for decahydronaphthalene, a method has been known in which decahydronaphthalene is irradiated with light in the presence of a transition metallic complex containing at least one kind of transition metal selected from cobalt, rhodium, iridium, iron, ruthenium, nickel and platinum, and thus hydrogen is removed from the decahydronaphthalene (see Japanese Patent Application Publication (JP-B) No. 3-9091). Further, a method has also been known in which decahydronaphthalene is irradiated with light in the presence of a rhodium complex of an organic phosphorous compound or in the presence of an organic phosphorous compound and a rhodium compound, to produce hydrogen from the decahydronaphthalene (see Japanese Patent Application Publication (JP-B) No. 5-18761).

However, when one of the above-described conventional hydrogen generating methods is applied to a hydrogen-utilizing device such as fuel cells of an electric vehicle, a reaction conversion ratio is low, and naphthalene, unreacted decahydronaphthalene and the like produced by the dehydrogenation, are included. Accordingly, there exists a problem that hydrogen partial pressure is low and the efficiency of the hydrogen-utilizing device deteriorates.

SUMMARY OF THE INVENTION

The present invention has been achieved in order to solve the above-described problem, and an object of the present invention is to provide an apparatus for generating hydrogen gas, employs a decahydronaphthalene/naphthalene reaction to supply a hydrogen-utilizing device with high purity hydrogen gas, and can improve the efficiency of the hydrogen-utilizing device.

In order to achieve the above-described object, in accordance with a first aspect of the present invention, there is provided an apparatus for generating hydrogen gas, which comprises: a storage tank in which fuel comprised of one of decahydronaphthalene and a substance that includes decahydronaphthalene as a principal component is stored; supplying means connected to the storage tank for supplying fuel from the storage tank; a reaction tank which includes a catalyst and a heater for heating the catalyst, the reaction tank being connected to the supplying means for receiving fuel supplied by the supplying means from the storage tank, the supplied fuel forming a liquid-film on the catalyst and being dehydrogenated to generate naphthalene and hydrogen gas; and a separation tank which includes hydrogen gas separation means, the separation tank being connected to the reaction tank for receiving naphthalene and hydrogen gas, and the hydrogen gas separation means separating hydrogen gas out of received naphthalene and hydrogen gas for discharge of the hydrogen gas.

In the present invention, the fuel stored in the storage tank, which fuel is comprised of decahydronaphthalene or contains decahydronaphthalene as the principal component, is supplied so as to form a liquid-film on the catalyst, and the supplied fuel causes a dehydrogenation reaction of the heated catalyst. Naphthalene and hydrogen gas are generated by the dehydrogenation of the decahydronaphthalene. The generated hydrogen gas is separated out by the hydrogen gas separation means and supplied to a hydrogen-utilizing device such as a fuel cell.

In accordance with the present invention, the hydrogen gas is separated by the hydrogen gas separation means. Therefore, hydrogen gas of a high purity can be supplied to the hydrogen-utilizing device, and the efficiency of the hydrogen-utilizing device can be improved.

In the first aspect of the present invention, a regeneration tank having another catalyst and another heater for heating the other catalyst can be further provided. Naphthalene and hydrogen gas are supplied to the tank, and the naphthalene is hydrogenated on the heated catalyst to regenerate tetrahydronaphthalene (Tetralin) or decahydronaphthalene. The regeneration tank may be associated with the hydrogen generating apparatus, or may be disposed at a filling station or the like separately from the hydrogen generating apparatus.

In the present invention, a hydrogen gas storage tank, in which excess hydrogen gas discharged from the separation tank is stored, can be further provided. The hydrogen gas stored in the hydrogen gas storage tank can be supplied to the hydrogen-utilizing device or supplied to the regeneration tank and utilized for hydrogenation of naphthalene.

Hydrogen gas can be supplied to the regeneration tank from outside the apparatus for generating hydrogen gas. In this case, a clean system can be constructed in which hydrogen gas generated by electrolysis of water is supplied.

A second aspect of the present invention is an apparatus for generating hydrogen gas, which comprises: a storage tank in which fuel comprised of one of decahydronaphthalene and a substance that includes decahydronaphthalene as a principal component is stored; first supplying means connected to the storage tank for supplying fuel from the storage tank; second supplying means for supplying naphthalene and hydrogen gas; a reaction-regeneration tank which includes a catalyst and a heater for heating the catalyst, selectively connectable in fluid communication to the first supplying means for receiving fuel supplied by the first supplying means and to the second supplying means for receiving naphthalene and hydrogen gas supplied by the second supplying means, wherein, when fuel is received, the fuel forms a liquid-film on the catalyst and is dehydrogenated to generate naphthalene and hydrogen gas, and when naphthalene and hydrogen gas are received, the naphthalene is hydrogenated on the catalyst; and a separation tank which includes hydrogen gas separation means, the separation tank being connected to the reaction-regeneration tank for receiving naphthalene and hydrogen gas, and to the second supplying means for supplying naphthalene, the hydrogen gas separation means separating hydrogen gas out of received naphthalene and hydrogen gas for discharge.

In the second aspect of the present invention, the reaction and regeneration of the first aspect are carried out using the same tank, that is, the reaction-regeneration tank. In the reaction-regeneration tank, when the fuel is supplied thereto, the catalyst is heated at 200° C. or higher and the supplied decahydronaphthalene is dehydrogenated thereon, or the catalyst is heated to 100° C. or higher and a mixed fuel of tetrahydronaphthalene and decahydronaphthalene is dehydrogenated thereon, thereby generating naphthalene and hydrogen gas. Further, when naphthalene and hydrogen gas are supplied, the catalyst is heated to at most 200° C. and the supplied naphthalene is hydrogenated thereon to generate tetrahydronaphthalene or regenerate decahydronaphthalene. When tetrahydronaphthalene is generated in the reaction-regeneration tank, heat remaining at the catalyst after completion of dehydrogenation can be utilized.

In the second aspect of the present invention as well, the hydrogen gas storage tank in which excess hydrogen gas discharged from the separation tank is stored can be further provided. When the hydrogen gas storage tank is provided, the hydrogen gas stored in the hydrogen gas storage tank can be supplied to the reaction-regeneration tank and used for hydrogenation of naphthalene. Further, in the same way as for the above-described regeneration tank, hydrogen gas may be supplied to the reaction-regeneration tank from outside the apparatus for generating hydrogen gas.

In the above-described first and second aspects of the present invention, an unreacted decahydronaphthalene-recovering device can further be provided, in which unreacted decahydronaphthalene which has not been dehydrogenated in the reaction tank or reaction-regeneration tank is recovered. The recovered unreacted decahydronaphthalene can be used as the crude fuel by being returned to the storage tank, can be supplied to the separation tank to remove naphthalene adhered to wall surfaces of the separation tank, or can be supplied to the supplying means or the first supplying means.

Further, with a hydrogen gas detector which detects a quantity of hydrogen gas generated by the dehydrogenation, and a control means which controls an amount of fuel on the catalyst such that the quantity of hydrogen gas detected by the hydrogen gas detector becomes a predetermined value or more, the quantity of hydrogen gas generated can be controlled so as to become the predetermined value.

Naphthalene is stored in the separation tank and can be hydrogenated at a predetermined time. Tetrahydronaphthalene generated by this hydrogenation, or regenerated decahydronaphthalene, can be supplied to the storage tank, the supplying device, or the first supplying device.

The above-mentioned hydrogen gas separation means can be formed by an adsorption-permeation device which adsorbs naphthalene and decahydronaphthalene and is permeable to hydrogen gas, a hydrogen gas separation film, or a cooling device for cooling down naphthalene and hydrogen gas. As the cooling device, a cooling device in which unreacted decahydronaphthalene and hydrogen gas and naphthalene generated by the reaction are separated by cooling can be used. As the adsorption-permeation device, a decahydronaphthalene/naphthalene-adsorption-separation and hydrogen gas-permeation device which uses a high surface area activated carbon and has a heating/regenerating function can be used. In this decahydronaphthalene/naphthalene-adsorption-separation and hydrogen gas-permeation device, because of the high surface area activated carbon, decahydronaphthalene and naphthalene are adsorbed and only hydrogen gas is permeated, and because of heating by the heating/regenerating function, decahydronaphthalene and naphthalene are removed from the high surface area activated carbon and regenerated. As a catalyst, any of a carbon-supported Pt catalyst, a carbon-supported Pt—Ir bimetallic catalyst, a carbon-supported Pt—Re bimetallic catalyst and a carbon-supported Pt—W bimetallic catalyst can be used.

When fuel containing decahydronaphthalene as the principal component, for example, a mixed fuel of decahydronaphthalene and tetrahydronaphthalene, is used, the tetrahydronaphthalene is dehydrogenated prior to dehydrogenation of the decahydronaphthalene. Therefore, hydrogen gas can be rapidly generated. Further, a naphthene-based fuel containing decahydronaphthalene may also be used as the fuel containing decahydronaphthalene as the principal component.

Further, tetrahydronaphthalene can be stored in the storage tank or in a different tank separately from the fuel composed of decahydronaphthalene or containing decahydronaphthalene as the principal component, and the tetrahydronaphthalene can be dehydrogenated on the heated catalyst prior to dehydrogenation of the fuel. As a result, a large quantity of hydrogen gas can be generated prior to dehydrogenation of the fuel more rapidly than by dehydrogenation of the fuel. Accordingly, when the hydrogen generating apparatus of the present invention is mounted in a vehicle equipped with fuel cells, and tetrahydronaphthalene is dehydrogenated at a time of starting, startability can be improved. Also, by dehydrogenation of tetrahydronaphthalene at a time of acceleration, acceleration response can be improved.

In the present invention, a decahydronaphthalene/naphthalene reaction is utilized. Decahydronaphthalene has a high boiling point and is easily handled at ordinary temperatures. Naphthalene is apt to sublimate, coagulate or crystallize, and is easily separated from hydrogen gas. Further, naphthalene shows thixotropy with respect to hydrocarbon-based liquid-phase materials containing decahydronaphthalene or tetrahydronaphthalene, and is easily molten. Further, stable techniques publicly known in relation to aviation fuels can be used for regeneration of decahydronaphthalene from naphthalene. Thus, hydrogen gas of a high purity can be generated safely and with excellent environmental characteristics.

BRIEF DESCRIPTION OF THE DRAWINGS

FIG. 11 is a schematic diagram showing a reactor utilizing a rotating disk-shaped catalyst.

FIG. 12A is a schematic diagram showing still yet another example of the reactor according to the present invention.

FIG. 12B is an enlarged view of a portion B shown in FIG. 12A.

DETAILED DESCRIPTION OF THE PREFERRED EMBODIMENTS

A first embodiment of the present invention will be hereinafter described in detail with reference to the attached drawings. According to the present embodiment, an apparatus for generating hydrogen gas according to the embodiment of the present invention is mounted in an electric vehicle equipped with fuel cells which use hydrogen gas as a fuel. In the present embodiment, a decahydronaphthalene/naphthalene reaction in which naphthalene and hydrogen gas are generated when decahydronaphthalene is made to react in the presence of a high-temperature catalyst is employed. Thus, hydrogen gas molecules are not stored by absorption, but are instead stored in a crude fuel with chemical bonds.

Figure 1:
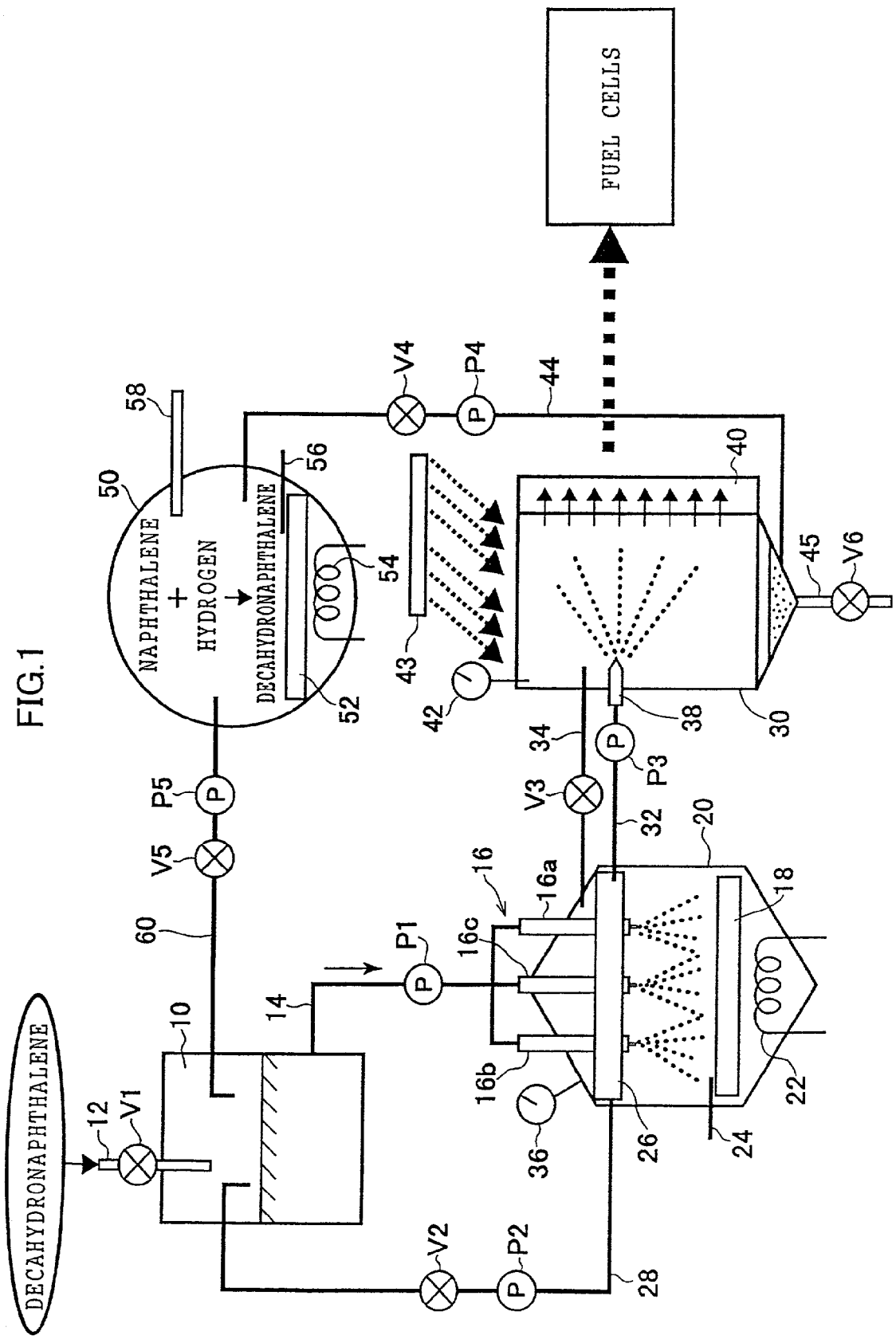
FIG. 1 is a schematic diagram showing a first embodiment of the present invention.

As shown in FIG. 1, in the present embodiment are provided a storage tank 10 in which decahydronaphthalene used as the crude fuel is stored, a reaction tank 20 provided with a catalyst and a heater for heating the catalyst and producing naphthalene and hydrogen gas by causing dehydrogenation of decahydronaphthalene supplied from the storage tank 10 at the heated catalyst, and a separation tank 30 for separating hydrogen gas out of naphthalene and hydrogen-rich gas supplied from the reaction tank 20.

Supply piping 12 having a valve V1, for initially supplying decahydronaphthalene from an external filling station or refinery to the storage tank 10, is attached to the storage tank 10. One end of supply piping 14 having a supply pump P1 is attached at a wall surface of the storage tank 10 at the side of a bottom surface of the tank. Another end of the supply piping 14 branches into plural portions and branched ends are respectively connected to a plurality of decahydronaphthalene injection devices 16a, 16b and 16c which form a decahydronaphthalene supplying device 16 mounted at an upper portion of the reaction tank 20. The decahydronaphthalene supplying device 16 supplies decahydronaphthalene by injection, addition, or the like such that decahydronaphthalene enters a liquid-film state on the catalyst 18. The liquid-film state is a state in which the surface of the catalyst is slightly wetted with decahydronaphthalene. A hydrogen gas generation amount is at a maximum during dehydrogenation in an superheated (heating at a temperature exceeding the boiling point of decahydronaphthalene) liquid-film state. This is due to the facts that an evaporation rate decreases as a substrate liquid amount (that is, a liquid amount of decahydronaphthalene) becomes smaller, and a conversion ratio is improved by dehydrogenation with a small evaporation rate in a high temperature state. In other words, the evaporation rate is proportional to each of the amount of the liquid, a heat transfer area, and a temperature difference between a heating source and the boiling point. Therefore, so long as the amount of liquid decahydronaphthalene is small, the evaporation rate is low. The liquid decahydronaphthalene is present as a liquid-film even on the heated catalyst (at, for example, 200 to 350° C.). Accordingly, catalytic activity sites are constantly covered to a sufficiently high degree of coverage due to rapid adsorption of decahydronaphthalene from the liquid phase. That is, by dehydrogenation of the decahydronaphthalene in the liquid-film on the surface of the catalyst, more excellent reactivity is obtained than in a case where decahydronaphthalene is made to react on the surface of the catalyst in a gaseous state.

A catalytic reactor formed of the catalyst 18 and a first heater 22 for heating the catalyst is provided at the bottom surface side of the reaction tank 20. The catalytic reactor simultaneously causes generation and absorption of heat on both surfaces of a high heat transfer substrate on which the catalyst is provided. The side of the catalyst 18 on which dehydrogenation is carried out is constructed in such a manner that catalytic metal fine grains are supported by a porous carbon carrier. Examples of the catalyst include a carbon-supported Pt catalyst, a carbon-supported Pt—Ir bimetallic catalyst, a carbon-supported Pt—Re bimetallic catalyst, and a carbon-supported Pt—W bimetallic catalyst, which use noble metals such as Pt, Pt—Ir, Pt—Re and Pt—W. Further, a nickel-based metal may also be used as the catalytic metal.

Figure 2:
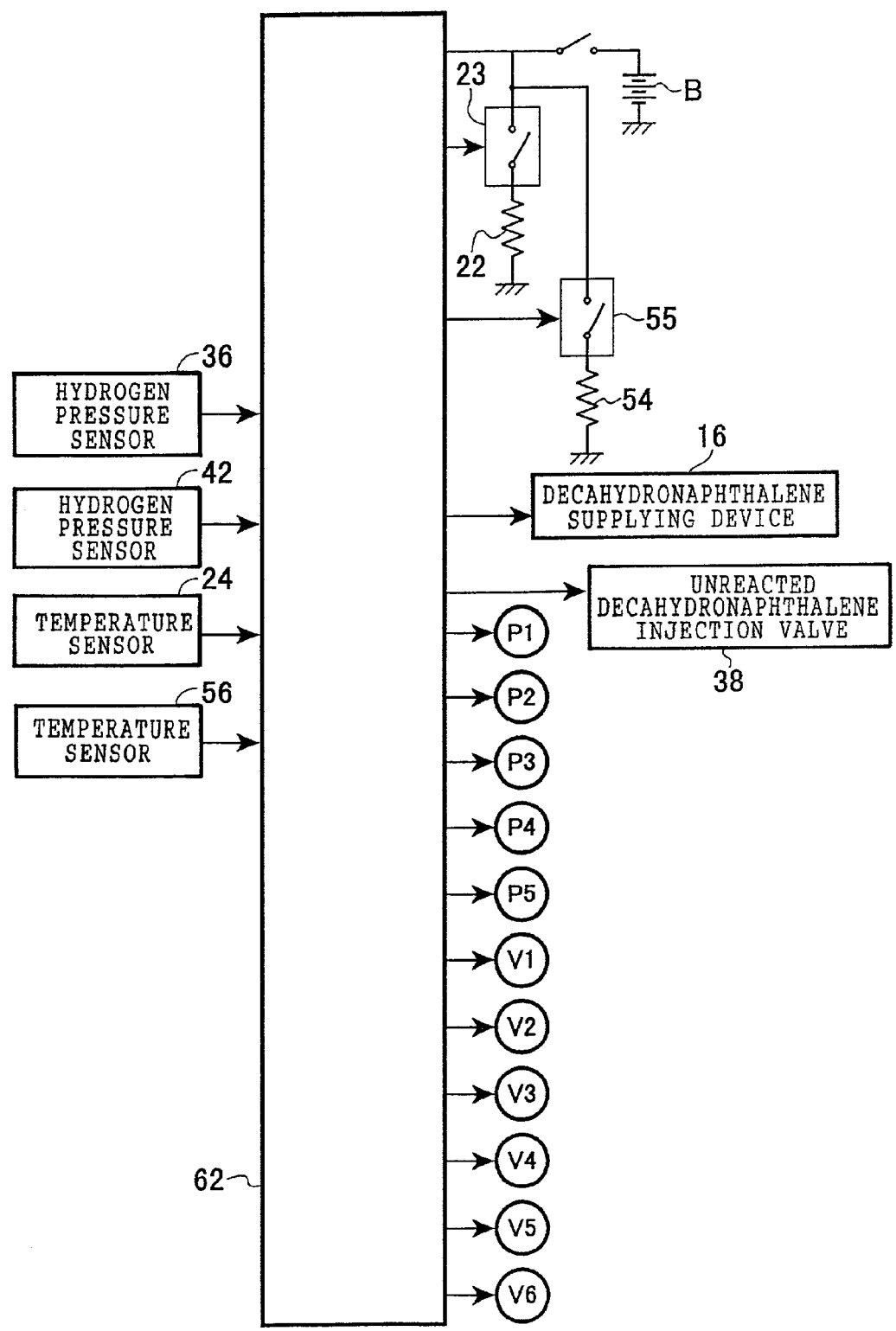
FIG. 2 is a block diagram showing a control device according to the first embodiment of the present invention.

The first heater 22 is, as shown in FIG. 2, connected to an on-vehicle battery B via a switching element 23 which is controlled between on/off states. Further, a first temperature sensor 24 for detecting the temperature $T_{1c}$ of the surface of the catalyst, is mounted in the vicinity of the catalyst 18.

An unreacted decahydronaphthalene recovering device 26 is mounted at an upper side of the reaction tank 20 and is provided so as to recover unreacted decahydronaphthalene, by cooling to condense unreacted decahydronaphthalene vapor vaporized from the surface of the catalyst 18 and the like. The unreacted decahydronaphthalene recovering device 26 is provided with a valve V2 and a supply pump P2, and is connected to the storage tank 10 via return piping 28 for returning the unreacted decahydronaphthalene to the storage tank 10. Further, the unreacted decahydronaphthalene recovering device 26 is connected to an injection valve 38 via supply piping 32 having a supply pump P3. The injection valve 38 is mounted on a wall surface of the separation tank 30 and injects the unreacted decahydronaphthalene toward solid naphthalene coagulated and adhered to the wall surface of the separation tank 30. A first hydrogen pressure sensor 36, for detecting an amount of hydrogen gas generated by detecting pressure of hydrogen gas, is attached to the reaction tank 20.

The reaction tank 20 is connected to the separation tank 30 via supply piping 34 having a valve V3. The separation tank 30 includes, on the side wall thereof, a high surface area activated carbon device for adsorption-refining, which has a heat regeneration function, absorbs and removes organic compounds such as decahydronaphthalene and naphthalene, and refines and permeates hydrogen, and a hydrogen separation film 40 formed of a hydrogen-permeable refining thin film structured of palladium or palladium alloy. Hydrogen gas separated by the hydrogen separation film 40 is supplied to on-vehicle fuel cells, which are a hydrogen-utilizing device.

A cooling device 43 is disposed outside the separation tank 30 and is provided to cool the side wall of the separation tank 30 by air cooling or water cooling so as to coagulate gaseous naphthalene in the separation tank 30. Due to the separation tank 30 being cooled by the cooling device 43, the naphthalene coagulates, and at the same time, unreacted decahydronaphthalene condenses and falls, thus separating the unreacted decahydronaphthalene from the hydrogen gas. The hydrogen separation film 40 is used to refine the thus concentrated hydrogen gas and completely remove naphthalene and decahydronaphthalene therefrom. In order to efficiently separate and refine the hydrogen gas, a cooled film of a high surface area activated carbon that is permeable only to hydrogen gas and has a high ability of absorbing organic compounds such as naphthalene and decahydronaphthalene, or a hydrogen separation film made of a palladium alloy, is used. A second hydrogen pressure sensor 42 for detecting an amount of hydrogen gas generated by detecting pressure of hydrogen gas is attached to the separation tank 30. Naphthalene and decahydronaphthalene which have been separated by being cooled and absorbed by activated carbon are appropriately removed and regenerated by heating. Further, the separation tank 30 is provided with an exhaust tube 45 having a valve V6 for discharging naphthalene retained in the separation tank. A preliminary hydrogen storage tank (not shown), in which excess hydrogen gas is stored, may be connected to the separation tank 30. A naphthalene solution retained in the separation tank can be discharged from the exhaust tube 45 into a naphthalene storage tank provided in a filling station or the like.

In the present embodiment, a regenerating tank 50 is further provided for regenerating decahydronaphthalene or tetrahydronaphthalene by hydrogenating naphthalene. The regenerating tank 50 is connected, via supply piping 44 having a valve V4 and a supply pump P4, to a naphthalene solution reservoir provided at the bottom side of the separation tank 30.

A catalyst reactor formed of a catalyst 52 and a second heater 54, for heating the catalyst and causing heat generation and heat absorption, is provided at a bottom side of the regenerating tank 50. A side of the catalyst 52 at which hydrogenation is carried out, is constructed with catalytic metal fine grains supported by a porous carbon carrier. Examples of the catalyst include the above-described carbon-supported Pt catalyst, carbon-supported Pt—Ir bimetallic catalyst, carbon-supported Pt—Re bimetallic catalyst, and carbon-supported Pt—W bimetallic catalyst. Further, a nickel-based metal may also be used as the catalytic metal.

The second heater 54 is, as shown in FIG. 2, connected to the on-vehicle battery B via a switching element 55 controlled between on/off states. Further, a second temperature sensor 56, for detecting the temperature $T_{2c}$ of the surface of the catalyst, is mounted in the vicinity of the catalyst 52.

A hydrogen gas supply tube 58 is attached to the regenerating tank 50 and supplies hydrogen gas from a hydrogen tank provided outside the vehicle, for example, in a filling station, a water electrolyzer or the like. The regenerating tank 50 is provided so as to produce decahydronaphthalene or tetrahydronaphthalene by carrying out hydrogenation with naphthalene and hydrogen gas using the catalyst. The produced decahydronaphthalene and tetrahydronaphthalene are supplied to the storage tank 10 via return piping 60, which has a valve V5 and a supply pump P5.

As shown in FIG. 2, the above-described decahydronaphthalene supplying device 16, unreacted decahydronaphthalene injection valve 38, pumps P1 to P5, valves V1 to V6, hydrogen pressure sensors 36 and 42, temperature sensors 24 and 56, and switching elements 23 and 55 are each connected to a control device 62 formed of a microcomputer or the like.

Figure 3:
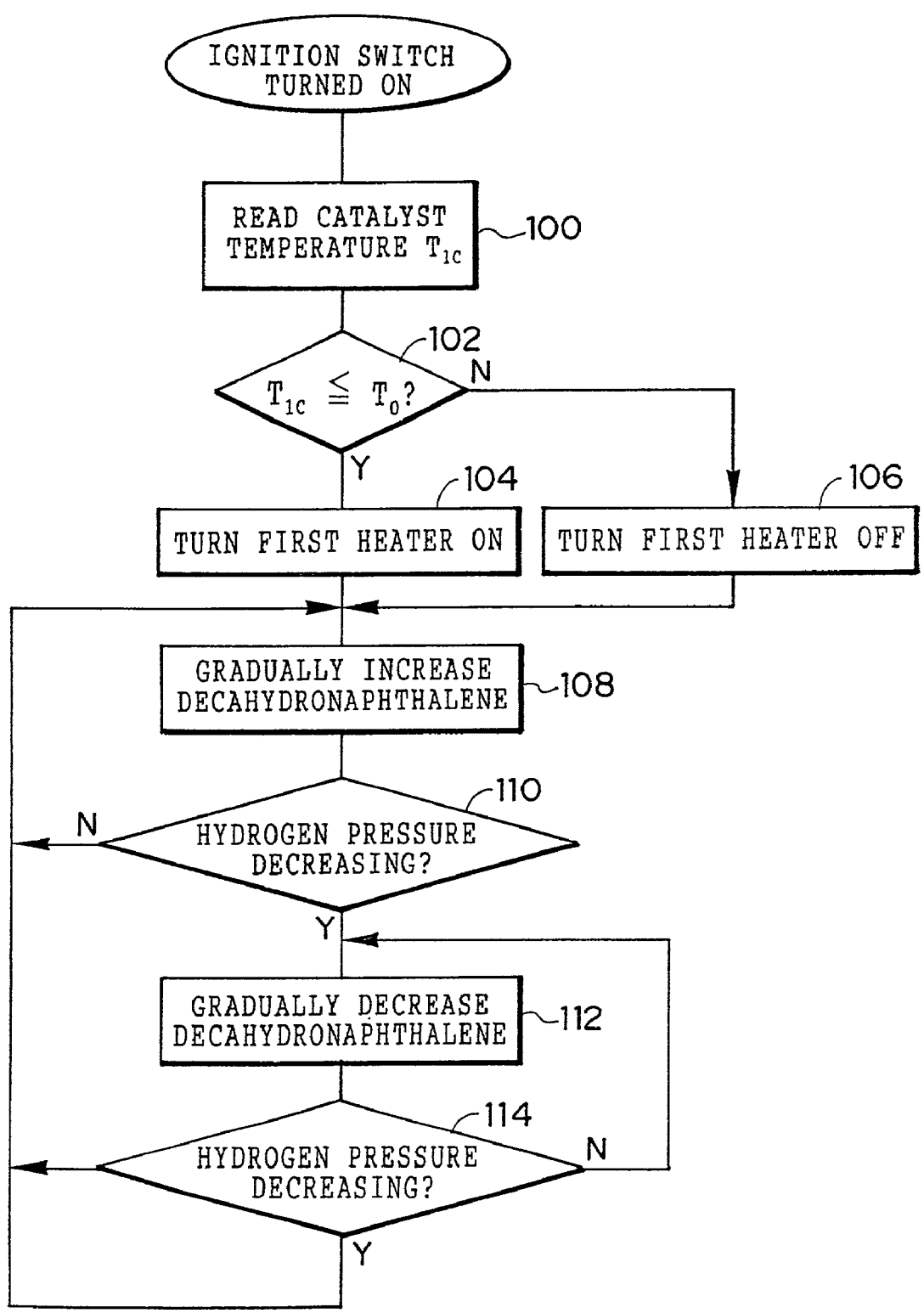
FIG. 3 is a flow diagram showing a main routine according to the first embodiment of the present invention.

Next, a description will be given of a control routine executed by the control device of the present embodiment. FIG. 3 shows a main routine executed when an ignition switch is turned on. First, in step 100, the temperature $T_{1c}$ of the first catalyst 18 is read. In step 102, it is determined whether or not the catalyst temperature $T_{1c}$ is higher than a predetermined temperature. If it is determined that the catalyst temperature $T_{1c}$ is the predetermined temperature or less, in step 104, the first heater 22 is turned on. If the catalyst temperature $T_{1c}$ is higher than the predetermined temperature, in step 106, the first heater 22 is turned off. As a result, the surface temperature of the first catalyst 18 is controlled so as to become the predetermined temperature. The predetermined temperature mentioned herein can be set in the range from 200 to 500° C., preferably in the range from 200 to 350° C., and further preferably at 280° C. If the predetermined temperature is lower than 200° C., an intended high reaction rate of dehydrogenation cannot be achieved. That is, sufficient output power of the fuel cells cannot be achieved. If the temperature is higher than 350° C., there is a possibility that carbon deposition may occur. Still further, a temperature higher than 500° C. is not preferable from a practical standpoint.

In subsequent step 108, decahydronaphthalene is supplied in gradually increasing amounts from a predetermined amount (that is, an amount of decahydronaphthalene just below that at which a liquid film is formed on the surface of the catalyst). In step 110, based on an average value of hydrogen pressure detected by the hydrogen pressure sensor 36 and the hydrogen pressure sensor 42, it is determined whether the hydrogen pressure is increasing or not, that is, whether or not a level of hydrogen gas generation is increasing. When the hydrogen pressure is increasing, the process returns to step 108 and the operation of gradually increasing the amount of decahydronaphthalene supplied is repeated. As a result, decahydronaphthalene is gradually supplied onto the dry catalyst so that the surface of the catalyst is gradually made wet. Thus, the decahydronaphthalene is supplied as a liquid-film, and therefore an amount of hydrogen generated approaches a maximum value.

When it is determined in step 110 that the hydrogen pressure is decreasing, decahydronaphthalene is being excessively supplied compared with the case in which the decahydronaphthalene is in the liquid-film state. Therefore, in step 112, the decahydronaphthalene is supplied in gradually decreasing amounts. In step 114, it is determined whether or not the hydrogen pressure has decreased. If the hydrogen pressure has increased, the process returns to step 112 and the operation of gradually decreasing an amount of decahydronaphthalene supplied is repeated. If the hydrogen pressure has decreased, the process returns to step 108, and the operation of gradually increasing the amount of decahydronaphthalene supplied is repeated.

As a result, the decahydronaphthalene is constantly maintained as a liquid-film on the surface of the catalyst, and the decahydronaphthalene is supplied so that the hydrogen pressure, that is, the amount of hydrogen gas generated, is maximized.

The hydrogen-rich gas thus generated is, together with gaseous decahydronaphthalene and naphthalene, supplied to the separation tank 30 by opening the valve V3. In the separation tank 30, decahydronaphthalene is condensed and naphthalene is coagulated due to the cooling by the cooling device 43 while hydrogen gas is separated from traces of decalin and naphthalene by the hydrogen separation film 40 and discharged from the tank. As a result, hydrogen gas of high purity is supplied to the fuel cells. Electric power generated in the fuel cells is supplied to a motor mounted on the electric vehicle to drive the motor, and is also supplied to the on-vehicle battery B and stored therein, and further supplied to loads such as on-vehicle electrical equipment.

Here, hydrogen separation efficiency of the hydrogen separation film can be improved by the hydrogen gas within the separation tank being pressurized or brought into a high pressure state, or by outlet pressure of hydrogen gas in the separation tank being lowered (e.g., to a negative pressure). In the foregoing, there has been described an example in which the catalyst is heated by a heater. However, the catalyst may be heated by utilizing exhaust heat generated at the fuel cells, or by combusting excess hydrogen gas, methylcyclohexane, vapor of low-boiling-point hydrocarbon impurities generated in a decahydronaphthalene storage tank, or the like.

Figure 16:
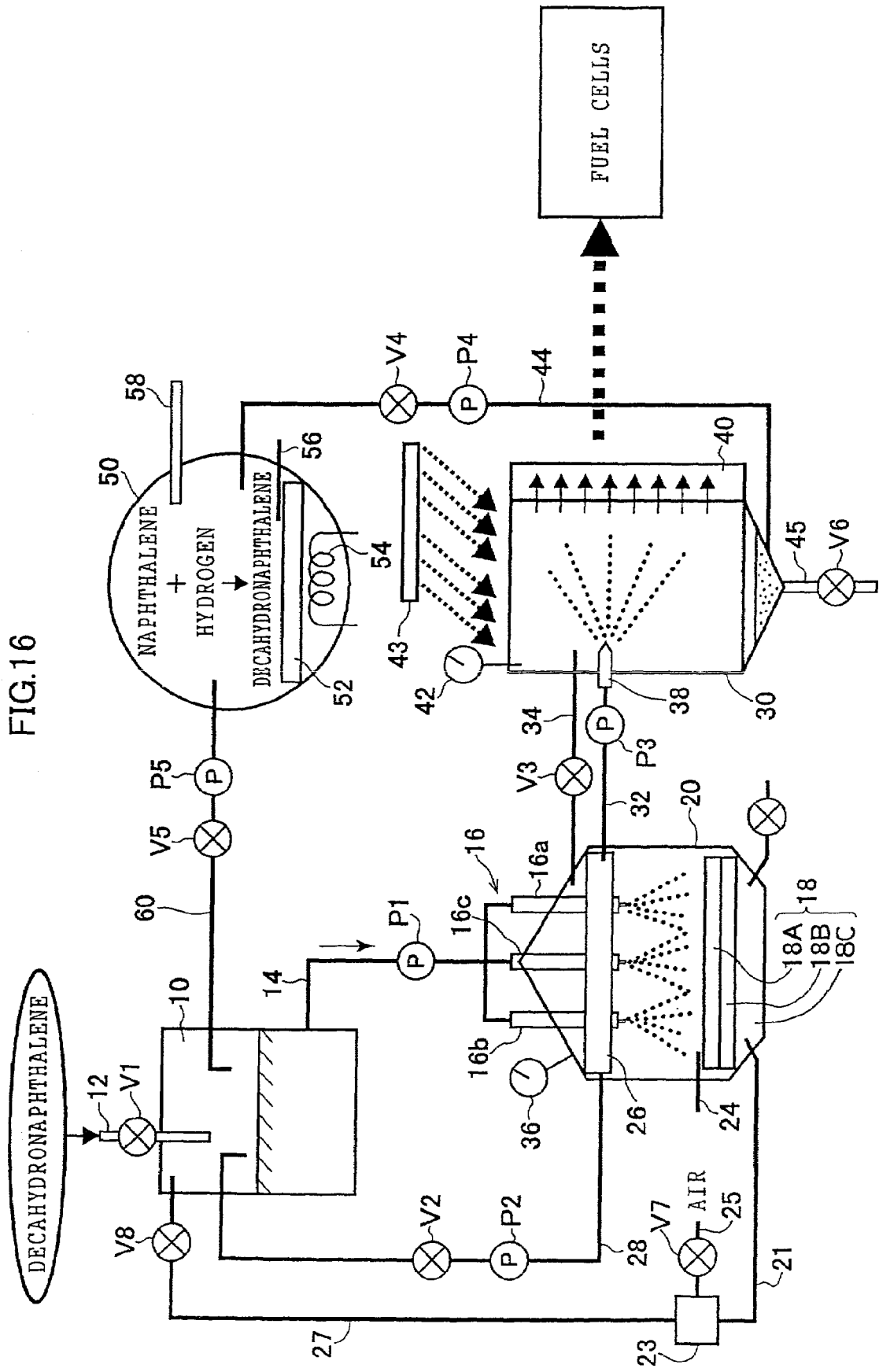
FIG. 16 is a schematic diagram showing another example of a heated portion of a catalyst in the preferred embodiments of the present invention.

FIG. 16 shows an example in which the catalyst is heated by combusting low-boiling hydrocarbon impurity vapor (hydrocarbon gas) generated in the decahydronaphthalene storage tank. The catalyst 18 is formed of a dehydrogenation-side catalyst 18A structured as described above, and an oxidation-side transition metal oxide catalyst 18B, which is provided at a reverse side of the dehydrogenation catalyst. The catalyst 18A and the catalyst 18B are supported to each other via a high heat transfer substrate. A combustion chamber 18C is formed at the transition metal oxide catalyst 18B side. The combustion chamber 18C communicates via piping 21 with a mixer 23 that mixes the hydrocarbon gas and air. An air supply pipe 25 having a valve V7 is connected to the mixer 23. Further, the mixer 23 is connected via vapor supply piping 27 having a valve V8 to a portion of the decahydronaphthalene storage tank 10 filled with hydrocarbon gas.

The catalyst 18 allows a mixture of air and hydrocarbon gas supplied from the decahydronaphthalene storage tank to be completely oxidized by the transition metal oxide catalyst on the reverse side of the dehydrogenation catalyst, and supplies necessary heat for the endothermic dehydrogenation reaction.

Further, in the foregoing, an example has been described wherein the fuel stored in the storage tank is decahydronaphthalene. However, a fuel in which decahydronaphthalene (main component) and tetrahydronaphthalene are mixed, or a naphthene-based hydrocarbon fuel containing decahydronaphthalene may be used, or a tetrahydronaphthalene storage tank in which tetrahydronaphthalene is stored may be provided separately from the storage tank in which decahydronaphthalene is stored. Tetrahydronaphthalene enables more rapid dehydrogenation than with decahydronaphthalene. Therefore, it is useful to use tetrahydronaphthalene when it is necessary to rapidly generate hydrogen gas, for example, at a time of starting a vehicle or at a time of acceleration.

Figure 4:
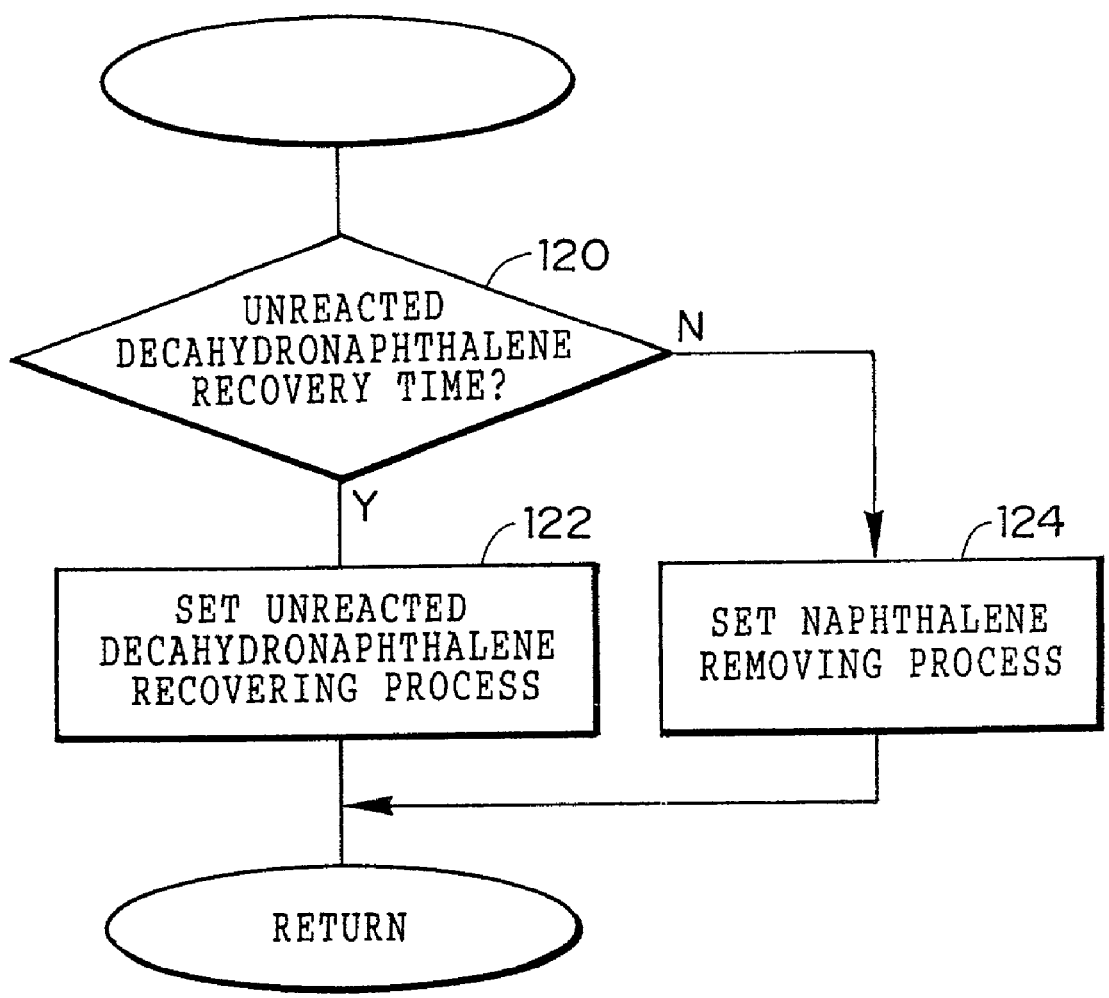
FIG. 4 is a flow diagram showing an interrupt routine, which is executed at predetermined time intervals, according to the first embodiment of the present invention.

During execution of the hydrogen gas generating process shown in FIG. 3, an interrupt routine shown in FIG. 4 is executed at predetermined time intervals. In step 120, it is determined whether an unreacted decahydronaphthalene recovery time has come. If the unreacted decahydronaphthalene recovery time has come, in step 122 an unreacted decahydronaphthalene recovering process is set and the process returns to the main routine. As a result, the pump P2 is driven for a predetermined time with the valve V2 opened and then the valve V2 is closed and the pump P2 is stopped. Thus, a predetermined amount of decahydronaphthalene recovered in the unreacted decahydronaphthalene recovering device 26 is supplied to the storage tank 10 via the return piping 28.

On the other hand, if it is determined in step 120 that it is not the unreacted decahydronaphthalene recovery time, in step 124 a naphthalene removing process is set and the process returns to the main routine. As a result, the injection valve 38 is opened and the pump P3 is driven for a predetermined time. Thus, unreacted decahydronaphthalene recovered in the unreacted decahydronaphthalene recovering device 26 is injected from the injection valve 38 toward the naphthalene adhered to the wall surface of the separation tank 30. Consequently, the naphthalene adhered to the wall surface of the separation tank is liquefied and removed from the wall surface, and pools on the bottom surface of the separation tank. When, for example, the vehicle stops running, the naphthalene thus stored in the separation tank is discharged, for example, into a recovering tank provided in a filling station or the like, by opening the valve V6 provided at the separation tank 30. The naphthalene recovered into the recovery tank is hydrogenated, by using hydrogen gas from a hydrogen tank provided in a filling station or the like, or generated by a water electrolyzer or by hydrogenation in a refinery or the like, thereby allowing regeneration of decahydronaphthalene. The decahydronaphthalene thus regenerated is re-supplied as crude fuel to a storage tank in a filling station or the like.

When the naphthalene adhering to the wall surface of the separation tank is being removed, preferably the separation tank is oscillated by using a vibration machine (not shown) while the unreacted decahydronaphthalene is injected toward the naphthalene. Further, when the electric vehicle is running on a rough road surface, the separation tank is oscillated due to the roughness of the road surface without use of the vibration machine. Accordingly, the naphthalene removing process may be carried out when the electric vehicle is running on a rough road surface. In this case, the vibration machine is not required. Coagulated naphthalene may also be removed by injecting high pressure air, or by being heated to a predetermined temperature (for example, 80° C. or thereabouts) using a heater provided at the wall surface of the separation tank.

Figure 5:
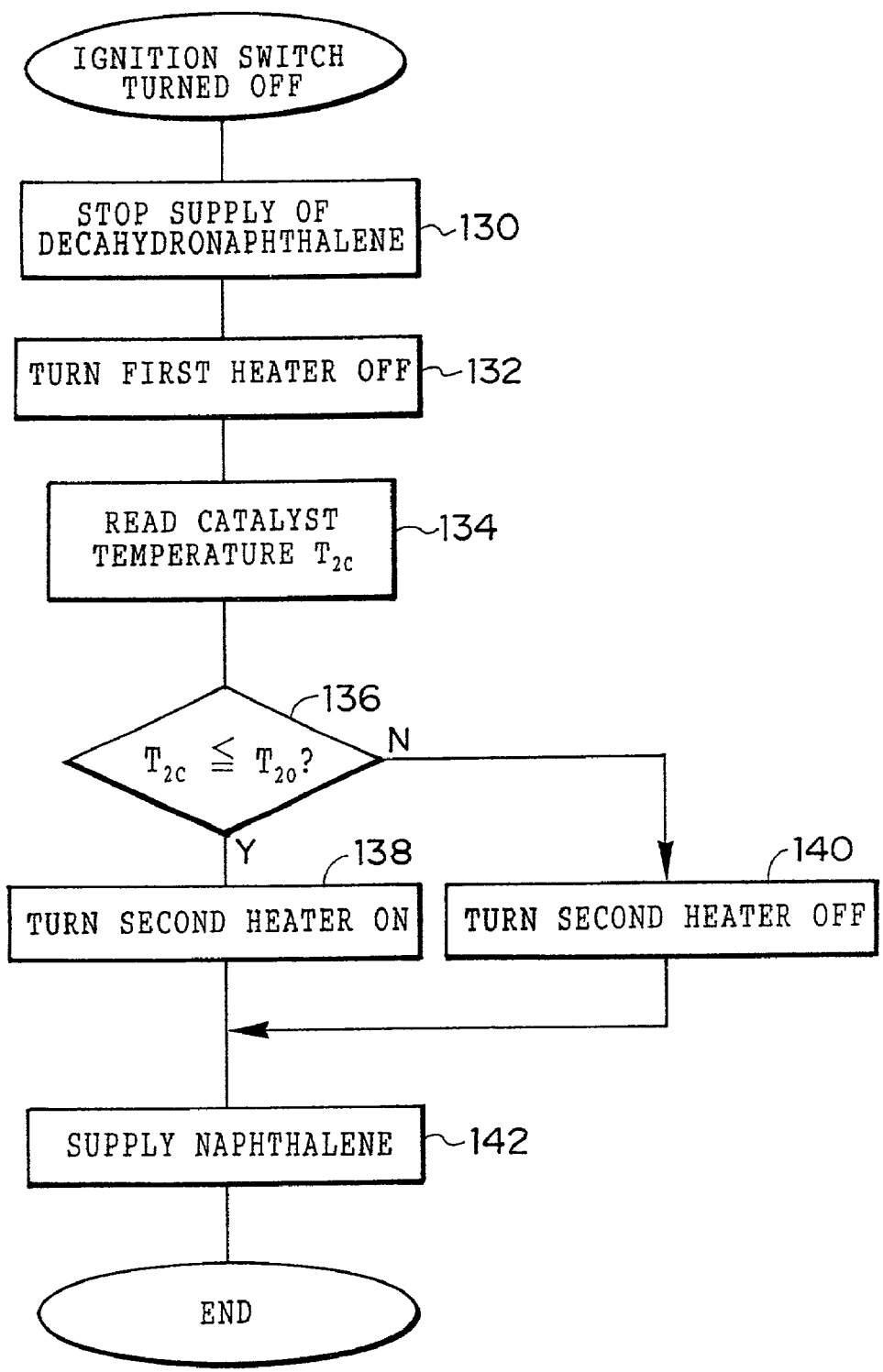
FIG. 5 is a flow diagram showing an interrupt routine for when the first embodiment of the present invention is interrupted by turning off an ignition switch.

When the vehicle is stopped and the ignition switch is turned off, an interrupt routine shown in FIG. 5 is activated. In step 130, the pump P1 is stopped and the decahydronaphthalene supplying device 16 stops supplying decahydronaphthalene, and in step 132 generation of hydrogen gas is stopped by turning off the first heater 22. A small amount of hydrogen gas is generated even after the supply of decahydronaphthalene has been stopped. This generated hydrogen gas may simply be stored in a preliminary hydrogen storage tank (not shown).

In the subsequent step 134, the temperature $T_{2c}$ of the second catalyst 52 is read. In step 136, it is determined whether or not the catalyst temperature $T_{2c}$ is less than or equal to a predetermined temperature $T_{2o}$. If the catalyst temperature $T_{2c}$ is the predetermined temperature $T_{2o}$ or less, in step 138 the second heater 54 is turned on. If the catalyst temperature $T_{2c}$ is higher than the predetermined temperature $T_{2o}$, in step 140 the second heater 54 is turned off. Thus, the catalyst temperature is controlled so as to become the predetermined temperature. This predetermined temperature can be set in the temperature range of 150 to 200° C., preferably at 150° C. or thereabouts.

In subsequent step 142, the valve V4 is opened and the pump P4 is driven. Thus, a mixed solution of naphthalene and unreacted decahydronaphthalene is supplied to the regeneration tank 50 via the supply piping 44. At the same time, hydrogen gas obtained from a hydrogen tank provided in a filling station or from a water electrolyzer is supplied to the regeneration tank, and naphthalene hydrogenation is carried out at the catalyst 52 controlled to the predetermined temperature to thereby regenerate decahydronaphthalene. The valve V5 is opened and the pump P5 is driven, and the regenerated decahydronaphthalene is recycled to the storage tank 10 via the supply piping 60. At this time, hydrogen gas within the regeneration tank is preferably pressurized or brought into a high pressure state.

When hydrogenation of naphthalene is to be carried out simply and rapidly, a process may be carried out in which the hydrogen gas is not pressurized, the temperature of the catalyst is lower than the above-described temperature, and thus tetrahydronaphthalene is generated, the generated tetrahydronaphthalene is supplied to a storage tank.

In the foregoing, an example has been described in which the regeneration tank 50 is mounted in the vehicle. However, decahydronaphthalene may be regenerated by installing the regeneration tank in a filling station or the like, and supplying hydrogen obtained by electrolysis of water in the filling station or the like.

Next, a second embodiment of the present invention will be described with reference to FIG. 6. In the second embodiment, decahydronaphthalene dehydrogenation and naphthalene hydrogenation are carried out in a switching manner using one tank, in which the reaction tank and the regeneration tank of the first embodiment are integrated. Fuel used by the first embodiment can also be used as a fuel of the second embodiment. Note that portions identical with those of FIG. 1 will be denoted by the same reference numerals and are not specifically described here.

Figure 6:
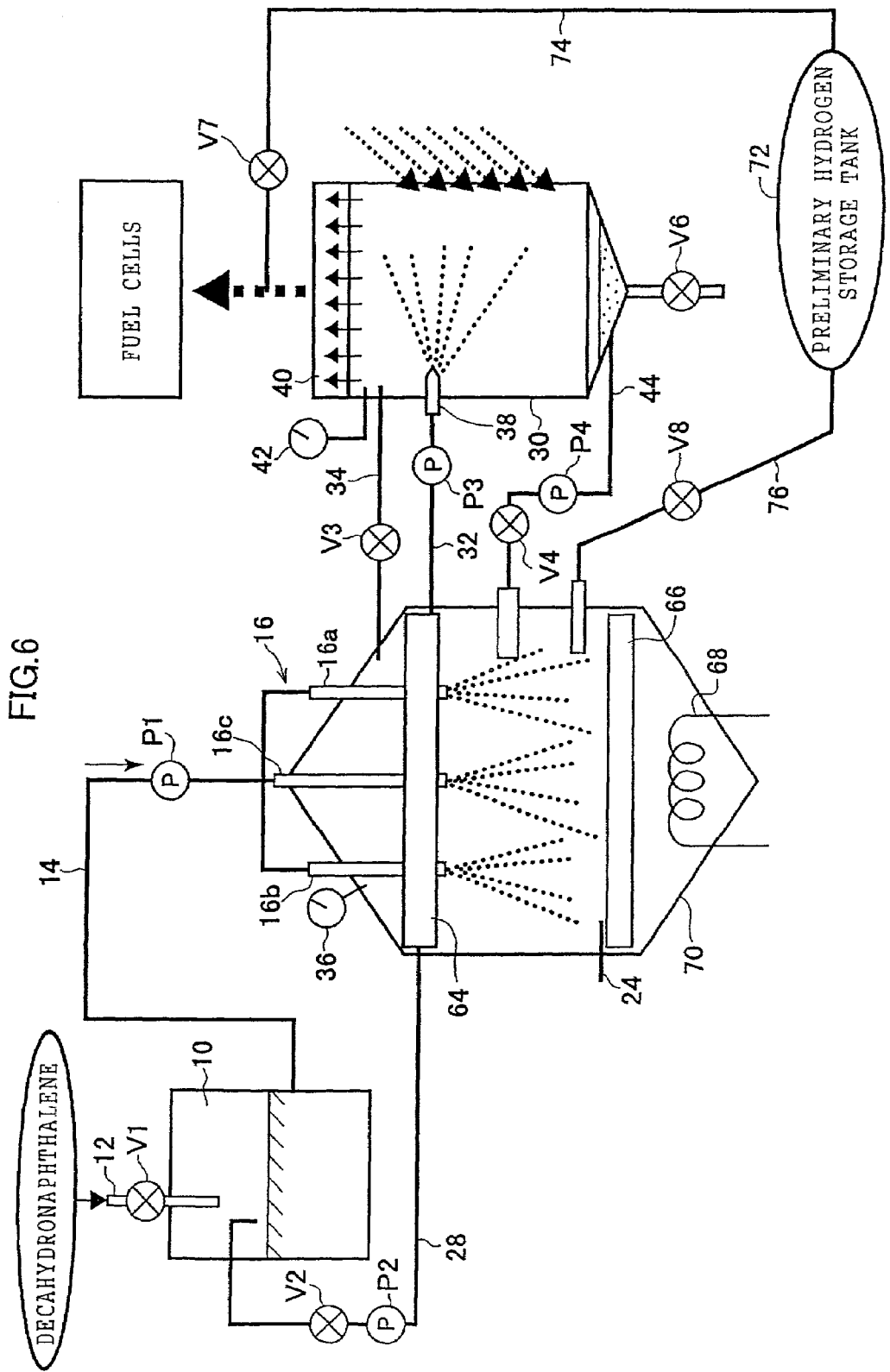
FIG. 6 is a schematic diagram showing a second embodiment of the present invention.

As shown in FIG. 6, in the second embodiment, a reaction-regeneration tank 70 is provided in place of the reaction tank 20 and the regeneration tank 50 shown in FIG. 1. The reaction-regeneration tank 70 is provided with a reactor comprised of a heater 68 which is used during decahydronaphthalene dehydrogenation and naphthalene hydrogenation, and a precious metal based catalyst 66 as described above. A decahydronaphthalene recovering device 64 for recovering unreacted decahydronaphthalene and regenerated decahydronaphthalene (or tetrahydronaphthalene in a case where tetrahydronaphthalene is regenerated) in a liquid state is provided at an upper side of the reaction-regeneration tank 70. The decahydronaphthalene recovering device 64 is connected via the return piping 28 to the storage tank 10.

Further, a preliminary hydrogen storage tank 72, in which excess hydrogen gas separated by the separation tank 30 is stored, is also provided. The preliminary hydrogen storage tank 72 is connected to a side at which hydrogen gas is discharged from the separation tank 30 via piping 74 having a valve V7, and is also connected to the reaction-regeneration tank 70, via piping 76 having a valve V8.

In the present embodiment, when the ignition switch is turned on, the catalyst 66 is heated by the heater 68 to a temperature of 200 to 350° C. as described in FIG. 3, decahydronaphthalene is supplied as a liquid-film and hydrogen gas is generated. The generated hydrogen gas is separated to be hydrogen gas of high purity in the separation tank 30, and supplied to fuel cells, while excess hydrogen gas is stored in the preliminary hydrogen storage tank 72 by opening the valve V7. Here, as described for the first embodiment, an unreacted decahydronaphthalene recovery process and a process for removing naphthalene coagulated and adhered to the wall surface of the separation tank are carried out with a predetermined timing.

When the ignition switch is turned off, power generation by the fuel cells is stopped. Therefore, as described above, supplying of decahydronaphthalene to the reaction-regeneration tank is stopped and the temperature of the catalyst is controlled so as to become a temperature in the range from 150 to 200° C., preferably 150° C. or thereabouts. Then, naphthalene stored in the separation tank 30 and the hydrogen gas stored in the preliminary hydrogen storage tank 72 are supplied to the reaction-regeneration tank 70, and decahydronaphthalene is regenerated by naphthalene hydrogenation under pressurization or high pressure of hydrogen gas. The regenerated decahydronaphthalene is supplied via return piping to the decahydronaphthalene storage tank.

Immediately after the ignition switch is turned off, the catalyst is at a high temperature. Therefore, tetrahydronaphthalene generated by utilizing remaining heat of the catalyst may also be returned to the storage tank. In this case, a crude fuel into which tetrahydronaphthalene is mixed and which contains decahydronaphthalene as the principal component is supplied, as a liquid-film, to the catalyst in the reaction-regeneration tank. In order that tetrahydronaphthalene be generated in the reaction-regeneration tank, the heat remaining in the catalyst after finishing dehydrogenation can be utilized, and therefore tetrahydronaphthalene can be generated without further adding energy during such generation.

According to the present embodiment, the reaction tank and the regeneration tank are structured as one reaction-regeneration tank, thereby making the whole apparatus smaller. Further, decahydronaphthalene dehydrogenation and naphthalene hydrogenation are carried out by using the one catalyst, and heat remaining from decahydronaphthalene dehydrogenation immediately after the ignition switch is turned off is utilized for naphthalene hydrogenation. Accordingly, energy consumption can be lessened.

Next, other examples of the reactor and the like will be described. The examples which will be described hereinafter can be applied to either of the above-described preferred embodiments.

Figure 7:
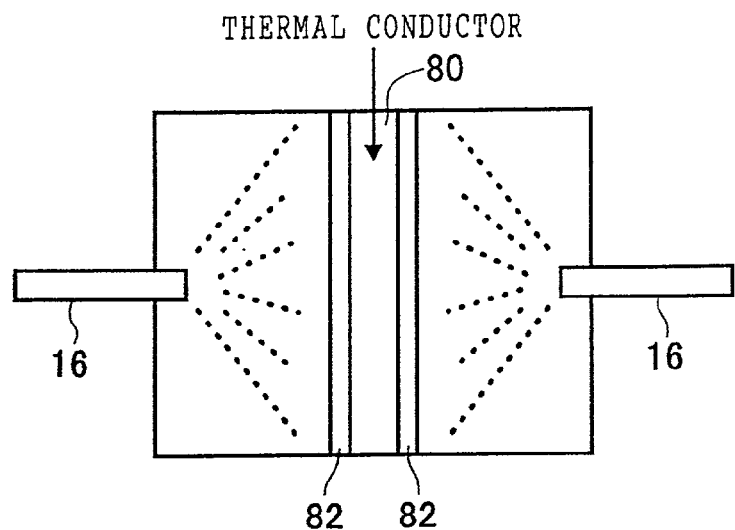
FIG. 7 is a schematic diagram showing another example of a reactor of the present invention.

A reactor shown in FIG. 7 is constructed such that catalysts 82 are disposed with a thermal conductor 80 interposed therebetween, which conductor is heated by heat from a heater, remaining heat of fuel cells, or combustion of excess hydrogen gas. Decahydronaphthalene is supplied, as a liquid-film, from an injection device of a decahydronaphthalene supplying device to each of the catalysts 82.

Figure 8A:
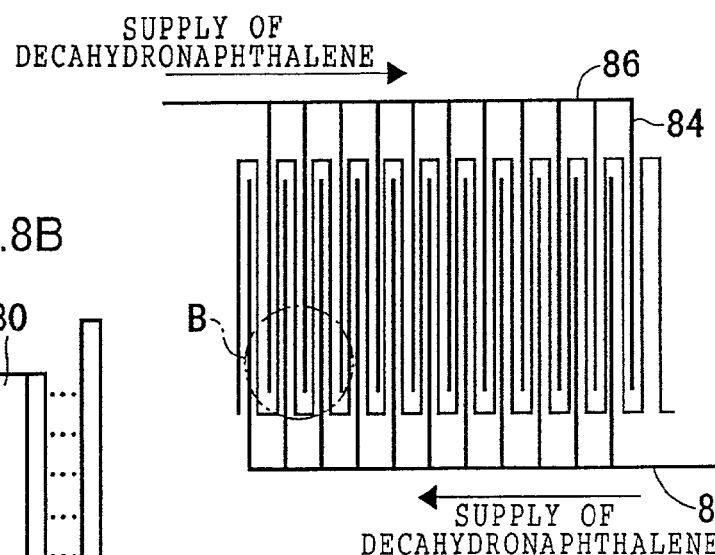
FIG. 8A is a schematic diagram showing still another example of the reactor according to the present invention.
Figure 8B:
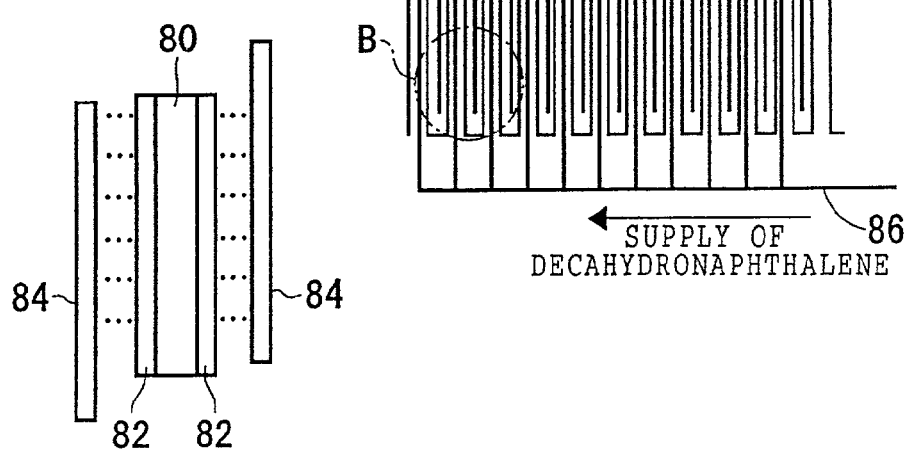
FIG. 8B is an enlarged view of a portion B shown in FIG. 8A.

FIG. 8A shows a corrugated reactor. As shown in FIG. 8B, effusion portions 84 each having a large number of jet holes formed therein are arranged in comb form in a decahydronaphthalene supplying device, and a pair of such decahydronaphthalene supplying devices 86 is disposed such that effusion portions of one decahydronaphthalene supplying device are positioned between effusion portions of the other decahydronaphthalene supplying device. A reactor constructed with the catalysts 82 having the thermal conductor 80 interposed therebetween, in the same manner as in FIG. 7, is bent into a corrugated form and positioned between the respective effusion portions of the two decahydronaphthalene supplying devices.

In the above-described reactor, the catalysts are disposed at both sides of the thermal conductor, and therefore the thermal efficiency in decahydronaphthalene dehydrogenation and naphthalene hydrogenation can be improved.

Figure 9:
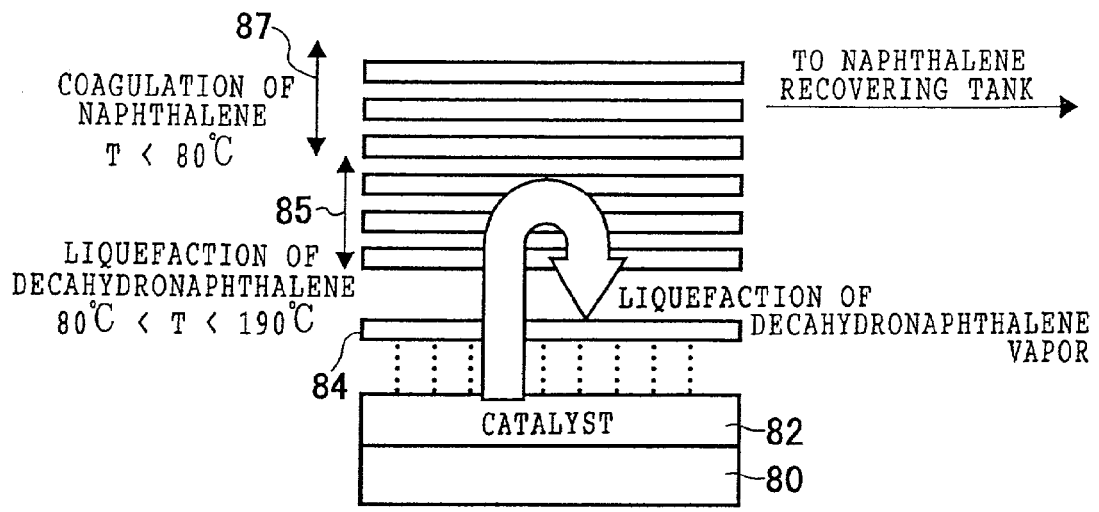
FIG. 9 is a schematic diagram showing a reactor and a cooling device.

FIG. 9 shows another example of the unreacted decahydronaphthalene recovering device. The unreacted decahydronaphthalene recovering device shown here is disposed adjacent to the catalyst 82 in the reaction tank so as to efficiently recover the unreacted decahydronaphthalene and naphthalene generated by decahydronaphthalene dehydrogenation. The catalyst 82 is provided on and supported by the thermal conductor 80. The unreacted decahydronaphthalene recovering device includes a plurality of cooling portions which are disposed as close to the catalyst as possible so as to cool down the gases in stages. A first cooling portion 85 disposed nearest to the catalyst is used to liquefy decahydronaphthalene vapor, and cools down gas supplied from the decahydronaphthalene supplying device 86 and vaporized by the catalyst to a first predetermined temperature (for example, 80 to 190° C.). Thus, decahydronaphthalene is liquefied and re-supplied to the catalyst. Further, a second cooling portion 87 disposed above the first cooling portion 85 cools down gas which has passed through the first cooling portion 85 to a second predetermined temperature lower than the first predetermined temperature (for example, 80° C. or less). As a result, naphthalene is coagulated, and is supplied to the naphthalene recovering tank.

In FIG. 9, naphthalene is coagulated in the reaction tank. Therefore, a cooling device for cooling down the separation tank is not required. Further, in this case, vaporized decahydronaphthalene is rapidly liquefied and recovered, and returned again to the catalyst. Therefore, the generation efficiency of the hydrogen gas and the rate at which the hydrogen gas is generated can be improved.

Figure 10:
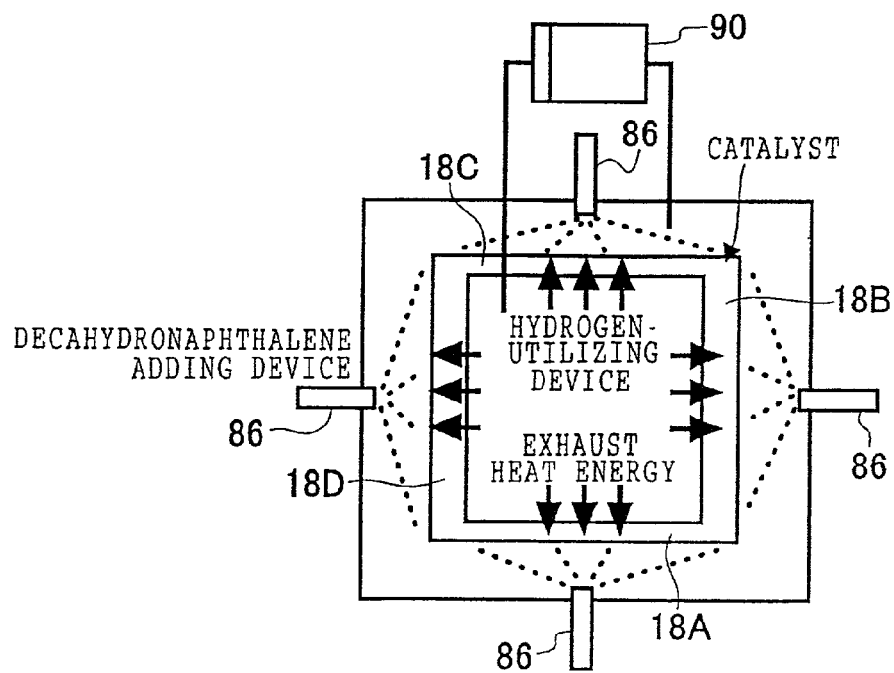
FIG. 10 is a schematic diagram showing a reactor utilizing exhaust heat.

FIG. 10 shows a structure in which the catalyst is heated by utilizing exhaust heat of the hydrogen-utilizing device such as fuel cells. The catalyst is structured such that four plate-shaped catalysts 18A to 18D are combined in a rectangular form having a cavity inside thereof, with reaction surfaces facing outward and heated surfaces facing one another.

Decahydronaphthalene as a liquid-film is supplied from the decahydronaphthalene supplying devices 86 to the reaction surfaces of the catalysts, and exhaust heat of the hydrogen-utilizing device is transferred to the inside of the catalysts, resulting in heating of the catalysts. The exhaust heat mentioned here can also be used to heat the catalyst in a recovering tank 90 and to remove naphthalene in the separation tank.

FIG. 11 shows another example of the reactor. A catalyst 92 is formed as a circular disk, and decahydronaphthalene is supplied from the decahydronaphthalene supplying device 86 to a portion on the surface of the catalyst. If decahydronaphthalene is supplied from the decahydronaphthalene supplying device 86 while the catalyst is rotated, a portion of the catalyst to which decahydronaphthalene has been supplied gradually moves. Therefore, if decahydronaphthalene is supplied in large amounts, a liquid-film can be generated at this decahydronaphthalene-supplied portion on the catalyst throughout the rotation of the catalyst. As a result, hydrogen gas can be constantly generated with a high conversion ratio.

FIGS. 12A and 12B show substantially the same structure as that of FIG. 8A. In the structure shown in FIGS. 12A and 12B, the decahydronaphthalene supplying device 86 in which the effusion portions 84 each having a large number of jet holes at both sides thereof are arranged in the form of a comb is used, and reactors, in which the thermal conductor 80 and the catalysts 82 are disposed, are arranged between adjacent effusion portions 84.

Figure 13:
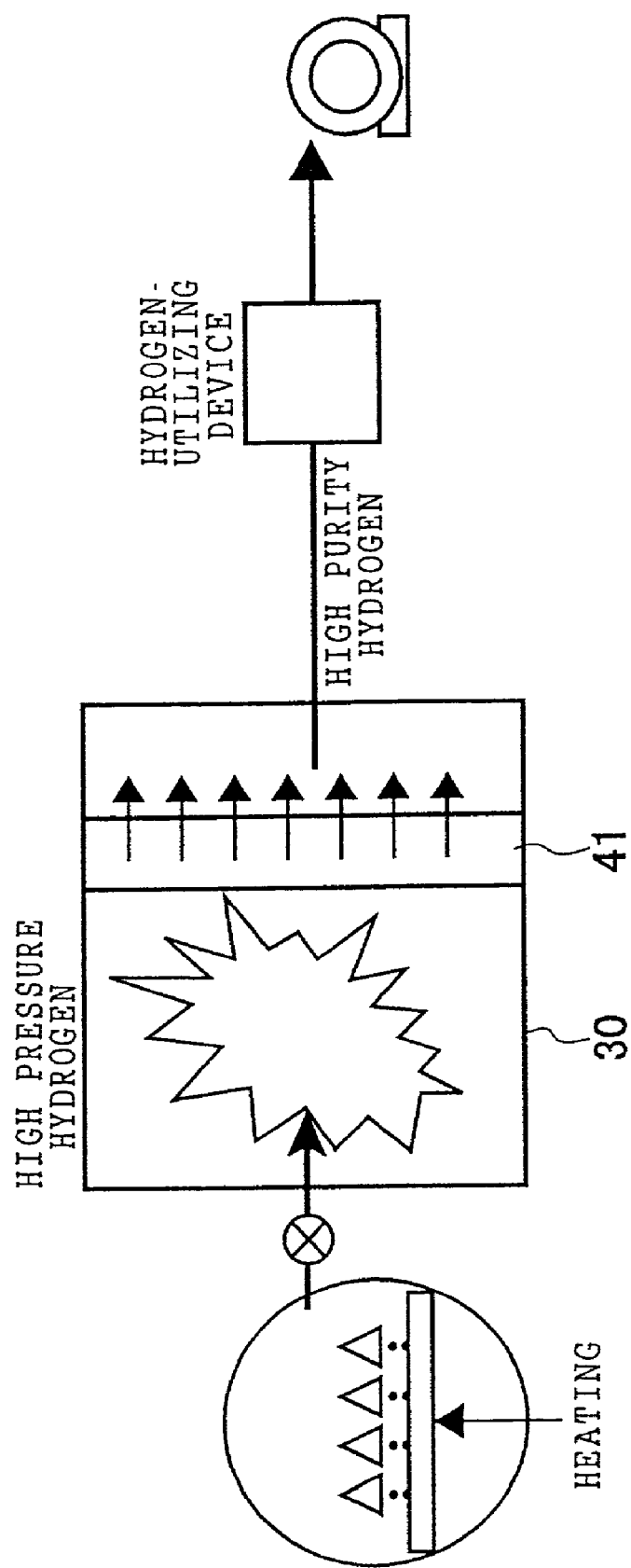
FIG. 13 is a schematic diagram showing a separation tank in which an inner portion thereof is pressurized or brought to a high pressure.

FIG. 13 shows a structure in which a piston 41 comprised of a hydrogen gas separation film is slidably disposed in the separation tank 30. The piston 41 is constantly urged by urging means, such as a spring, in a direction in which the capacity of the separation tank decreases. The piston is moved against urging force of the urging means by hydrogen-rich gas being supplied into the separation tank, and thus the hydrogen-rich gas in the separation tank 30 can be pressurized or put into a high pressure state. Accordingly, separation efficiency of the hydrogen gas is improved and high purity hydrogen can be supplied to the hydrogen-utilizing device. In the present embodiment, the hydrogen gas is brought to a high pressure by using the piston. However, the hydrogen gas can also be put into the high pressure state by using a hydrogen pressurizer instead of the piston. In FIG. 13, the separation efficiency of the hydrogen gas can also be improved by setting a side of the hydrogen separating film from which hydrogen gas exits at a negative pressure.

Figure 14:
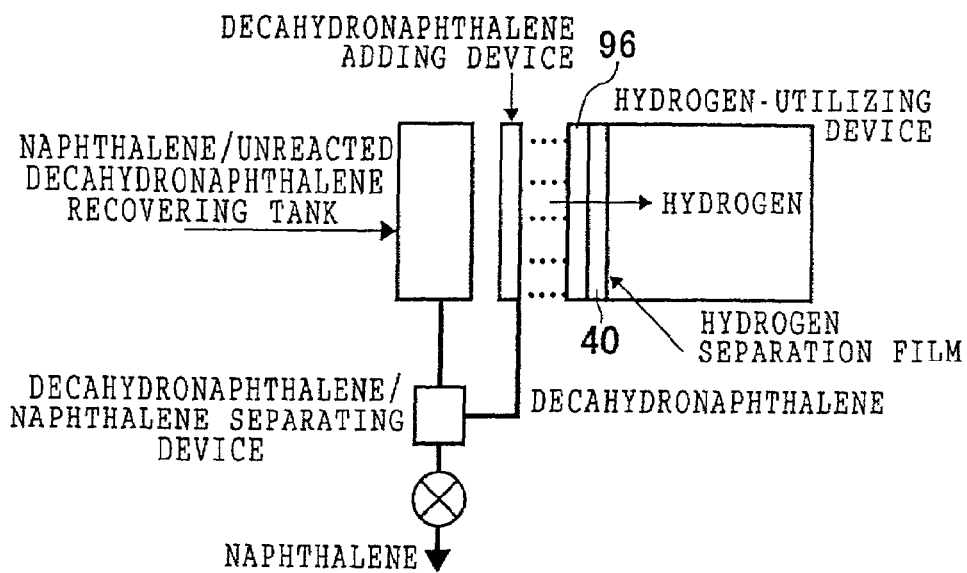
FIG. 14 is a schematic diagram showing a hydrogen generator in which a hydrogen separation film is incorporated with a hydrogen-utilizing device.

FIG. 14 shows a structure in which the hydrogen separation film 40 and a reactor 96 formed of a catalyst and a thermal conductor are disposed directly in the hydrogen-utilizing device such as a fuel cell. Decahydronaphthalene is supplied from outside the hydrogen-utilizing device, and hydrogen gas is supplied to the hydrogen-utilizing device without using piping. According to this structure, since the hydrogen separation film and the reactor are disposed directly in the hydrogen-utilizing device, the whole apparatus can be made smaller and exhaust heat from the hydrogen-utilizing device can be efficiently utilized.

Figure 15:
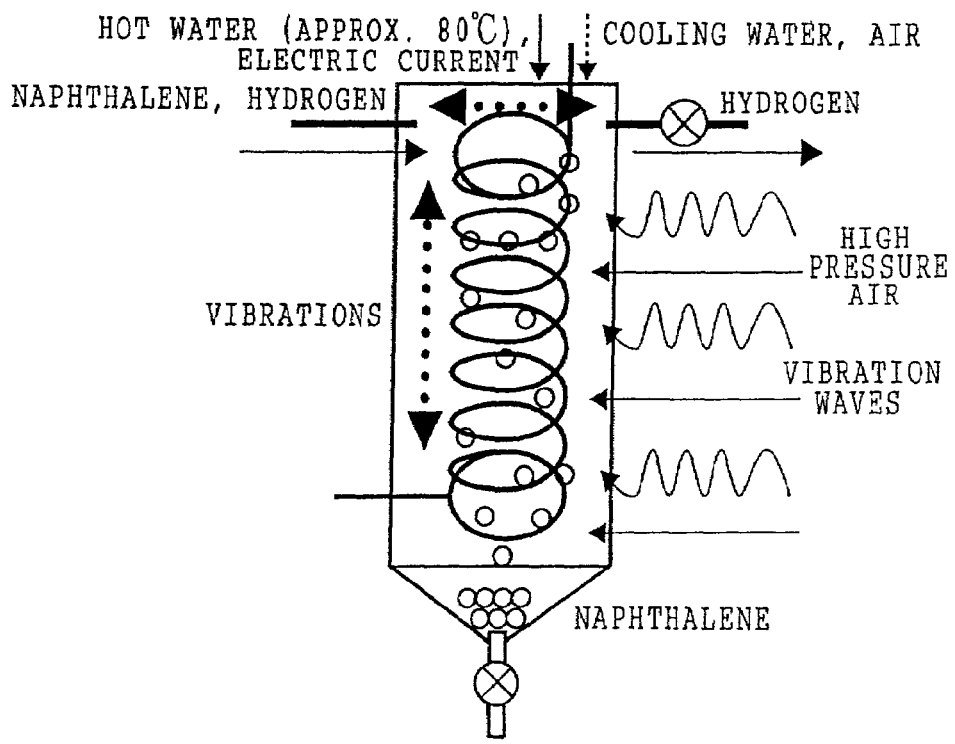
FIG. 15 is a conceptual diagram showing a state in which naphthalene adhering to a wall surface of a tank is removed.

FIG. 15 conceptually shows a method for removing naphthalene adhering to the wall surface of the separation tank. The naphthalene can be removed by hot water (for example, 80° C. or more), heating, supplying of high pressure air, vibrations and the like.

In the above-described preferred embodiments, there has been described an example in which on-vehicle fuel cells are the hydrogen-utilizing device. However, the present invention can be applied to a hydrogen-utilizing device other than the on-vehicle fuel cells.

As described above, in accordance with the present invention, hydrogen gas is generated by utilizing decahydronaphthalene/naphthalene reactions and separated. Therefore, it is possible to supply hydrogen gas of high purity to a hydrogen-utilizing device, and thus improve the efficiency of the hydrogen-utilizing device.

What is claimed is:

1. An apparatus for generating hydrogen gas, the apparatus comprising:
a storage tank for fuel comprised of one of decahydronaphthalene and a substance that includes decahydronaphthalene as a principal component;
supplying means connected to the storage tank for supplying fuel from the storage tank;
a reaction tank which contains therein a catalyst and a heater for heating the catalyst, the reaction tank being connected to the supplying means for receiving fuel supplied by the supplying means from the storage tank, the supplied fuel forming a liquid-film on the catalyst and being dehydrogenated to generate naphthalene and hydrogen gas; and
a separation tank which contains therein a hydrogen gas separation means, the separation tank being connected to the reaction tank for receiving naphthalene and hydrogen gas, and the hydrogen gas separation means separating hydrogen gas out of received naphthalene and hydrogen gas for discharge of the hydrogen gas.

2. The apparatus of claim 1, further comprising a regeneration tank which contains therein another catalyst and another heater for heating the other catalyst, the regeneration tank being connected to the separation tank for receiving naphthalene, wherein the regeneration tank receives naphthalene and hydrogen gas, and the naphthalene is hydrogenated on the other catalyst.

3. The apparatus of claim 2, further comprising a hydrogen gas storage tank connected to the separation tank for receiving and storing hydrogen gas discharged from the separation tank.

4. The apparatus of claim 3, wherein the hydrogen gas storage tank is connected to the regeneration tank for supplying hydrogen gas to the regeneration tank.

5. The apparatus of claim 4, wherein hydrogen gas is supplied into the regeneration tank from an external source.

6. An apparatus for generating hydrogen gas, the apparatus comprising:
a storage tank for fuel comprised of one of decahydronaphthalene and a substance that includes decahydronaphthalene as a principal component;
first supplying means connected to the storage tank for supplying fuel from the storage tank;
second supplying means for supplying naphthalene and hydrogen gas;
a reaction-regeneration tank which contains therein a catalyst and a heater for heating the catalyst, selectively connectable in fluid communication to the first supplying means for receiving fuel supplied by the first supplying means and to the second supplying means for receiving naphthalene and hydrogen gas supplied by the second supplying means, wherein, when fuel is received, the fuel forms a liquid-film on the catalyst and is dehydrogenated to generate naphthalene and hydrogen gas, and when naphthalene and hydrogen gas are received, the naphthalene is hydrogenated on the catalyst; and
a separation tank which contains therein a hydrogen gas separation means, the separation tank being connected to the reaction-regeneration tank for receiving naphthalene and hydrogen gas, and to the second supplying means for supplying naphthalene, the hydrogen gas separation means separating hydrogen gas out of received naphthalene and hydrogen gas for discharge.

7. The apparatus of claim 6, further comprising a hydrogen gas storage tank connected to the separation tank for receiving and storing hydrogen gas discharged from the separation tank.

8. The apparatus of claim 7, wherein the hydrogen gas storage tank is connected to the reaction-regeneration tank for supplying hydrogen gas to the reaction-regeneration tank.

9. The apparatus of claim 6, wherein hydrogen gas is supplied to the reaction-regeneration tank from an external source.

10. The apparatus of claim 1, further comprising a decahydronaphthalene recovering apparatus which recovers unreacted decahydronaphthalene from the reaction tank.

11. The apparatus of claim 6, further comprising a decahydronaphthalene recovering apparatus which recovers unreacted decahydronaphthalene from the reaction-regeneration tank.

12. The apparatus of claim 10, wherein the decahydronaphthalene recovering apparatus is connectable to at least one of the storage tank and the separation tank for supplying decahydronaphthalene thereto.

13. The apparatus of claim 11, wherein the decahydronaphthalene recovering apparatus is connectable to at least one of the storage tank and the separation tank for supplying decahydronaphthalene thereto.

14. The apparatus of claim 1, further comprising:
a hydrogen gas detector connected to the reaction tank for detecting an amount of hydrogen gas generated by dehydrogenation; and
control means connected to the supplying means for controlling amount of fuel on the catalyst in accordance with the amount of hydrogen gas detected by the detector to generate at least a predetermined level of hydrogen gas.

15. The apparatus of claim 6, further comprising:
a hydrogen gas detector connected to the reaction-regeneration tank for detecting an amount of hydrogen gas generated by dehydrogenation; and
control means connected to the first supplying means for, when the reaction-regeneration tank is receiving fuel, controlling amount of fuel on the catalyst in accordance with the amount of hydrogen gas detected by the detector to generate at least a predetermined level of hydrogen gas.

16. The apparatus of claim 1, wherein naphthalene is stored in the separation tank.

17. The apparatus of claim 6, wherein naphthalene is stored in the separation tank.

18. The apparatus of claim 2, wherein at least one of tetrahydronaphthalene and decahydronaphthalene is generated in the regeneration tank and supplied to the storage tank.

19. The apparatus of claim 6, wherein at least one of tetrahydronaphthalene and decahydronaphthalene is generated in the regeneration tank and supplied to the storage tank.

20. The apparatus of claim 1, wherein the hydrogen gas separation means comprises at least one of an adsorption-permeation device which adsorbs naphthalene and decahydronaphthalene and permeates hydrogen gas, a hydrogen gas separation film, and a cooling device which cools naphthalene and hydrogen gas.

21. The apparatus of claim 6, wherein the hydrogen gas separation means comprises at least one of an adsorption-permeation device which adsorbs naphthalene and decahydronaphthalene and permeates hydrogen gas, a hydrogen gas separation film, and a cooling device which cools naphthalene and hydrogen gas.

22. The apparatus of claim 1, wherein the catalyst comprises at least one of a carbon-supported Pt catalyst, a carbon-supported Pt—Ir bimetallic catalyst, a carbon-supported Pt—Re bimetallic catalyst and a carbon-supported Pt—W bimetallic catalyst.

23. The apparatus of claim 6, wherein the catalyst comprises at least one of a carbon-supported Pt catalyst, a carbon-supported Pt—Ir bimetallic catalyst, a carbon- supported Pt—Re bimetallic catalyst and a carbon-supported Pt—W bimetallic catalyst.

24. The apparatus of claim 1, wherein the substance that includes decahydronaphthalene as a principal component comprises at least one of a mixed fuel of decahydronaphthalene and tetrahydronaphthalene, and a naphthene-based fuel that includes decahydronaphthalene.

25. The apparatus of claim 6, wherein the substance that includes decahydronaphthalene as a principal component comprises at least one of a mixed fuel of decahydronaphthalene and tetrahydronaphthalene, and a naphthene-based fuel that includes decahydronaphthalene.

26. The apparatus of claim 1, further comprising a tetrahydronaphthalene storage tank connected to the reaction tank, tetrahydronaphthalene being supplied therefrom to the heated catalyst and dehydrogenated prior to commencing dehydrogenation of the fuel.

27. The apparatus of claim 6, further comprising a tetrahydronaphthalene storage tank connected to the reaction-regeneration tank, tetrahydronaphthalene being supplied therefrom to the heated catalyst and dehydrogenated prior to commencing dehydrogenation of the fuel.

* * * * *